United States Patent [19]

McLagan

[11] 4,141,067

[45] Feb. 20, 1979

[54] MULTIPROCESSOR SYSTEM WITH CACHE MEMORY

[75] Inventor: Angus McLagan, Newport Beach, Calif.

[73] Assignee: General Automation, Anaheim, Calif.

[21] Appl. No.: 805,834

[22] Filed: Jun. 13, 1977

[51] Int. Cl.$^2$ ............................................. G06F 13/00
[52] U.S. Cl. ................................................... 364/200
[58] Field of Search ................ 364/200 MS File, 281, 364/434

[56] References Cited

U.S. PATENT DOCUMENTS

| | | | |
|---|---|---|---|
| 3,566,358 | 2/1971 | Hasbrouck | 364/200 |
| 3,581,291 | 5/1971 | Iwamoto | 364/200 |
| 3,967,247 | 6/1976 | Anderson et al. | 364/200 |

*Primary Examiner*—Harvey E. Springborn
*Attorney, Agent, or Firm*—Christie, Parker & Hale

[57] ABSTRACT

A multiprocessor system is described in which a plurality of central processor units share the same main memory over a common asynchronous bus. Each central processor directs all memory requests to its own high speed cache memory. If the request is to read data from memory, the cache memory control determines if the addressed data is present in the cache memory. If so, the data is transferred to the processor without accessing main memory over the bus. If the data is not present in the cache memory, the cache memory control gains access to the bus by a priority circuit and reads out the data from memory, storing the data in the cache memory at the same time that it transfers the data to the processor. If the memory request by the processor is to write data in memory, the cache memory control gains access to the bus and initiates a data store in the main memory. At the same time, the cache memory control determines if the existing data being overwritten at the addressed location in main memory is present in the cache memory. If so, it updates the data in the cache memory at the same time it writes the data in main memory.

4 Claims, 3 Drawing Figures

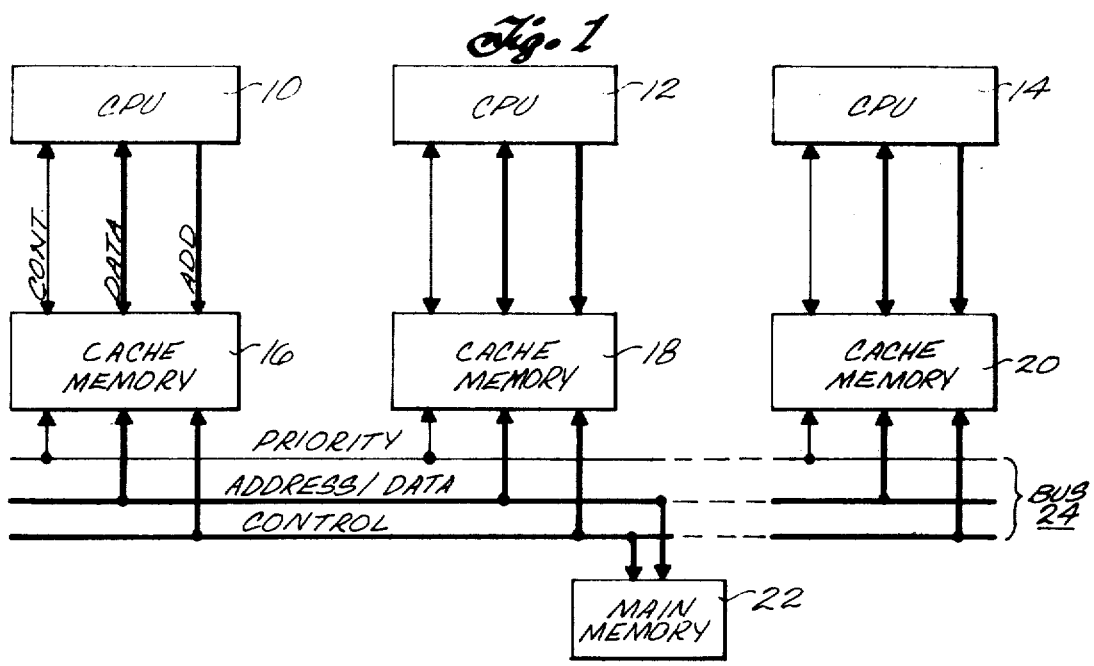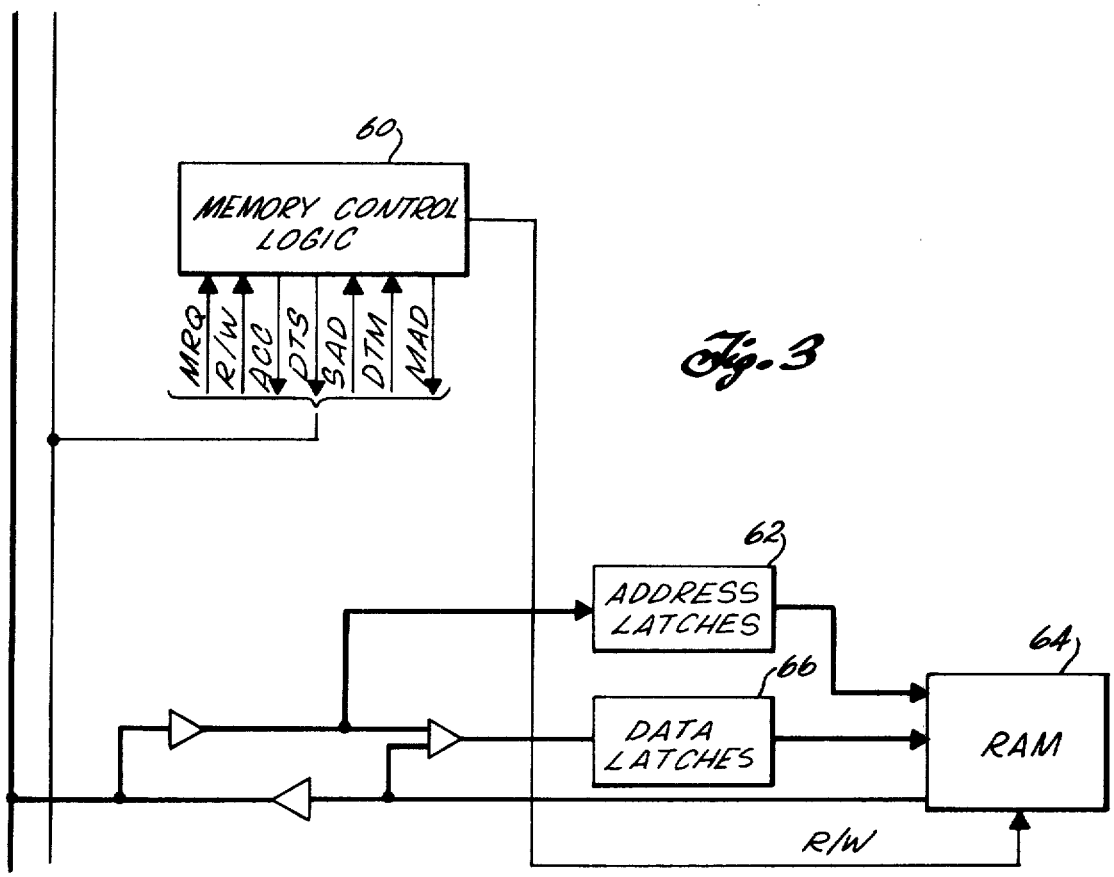

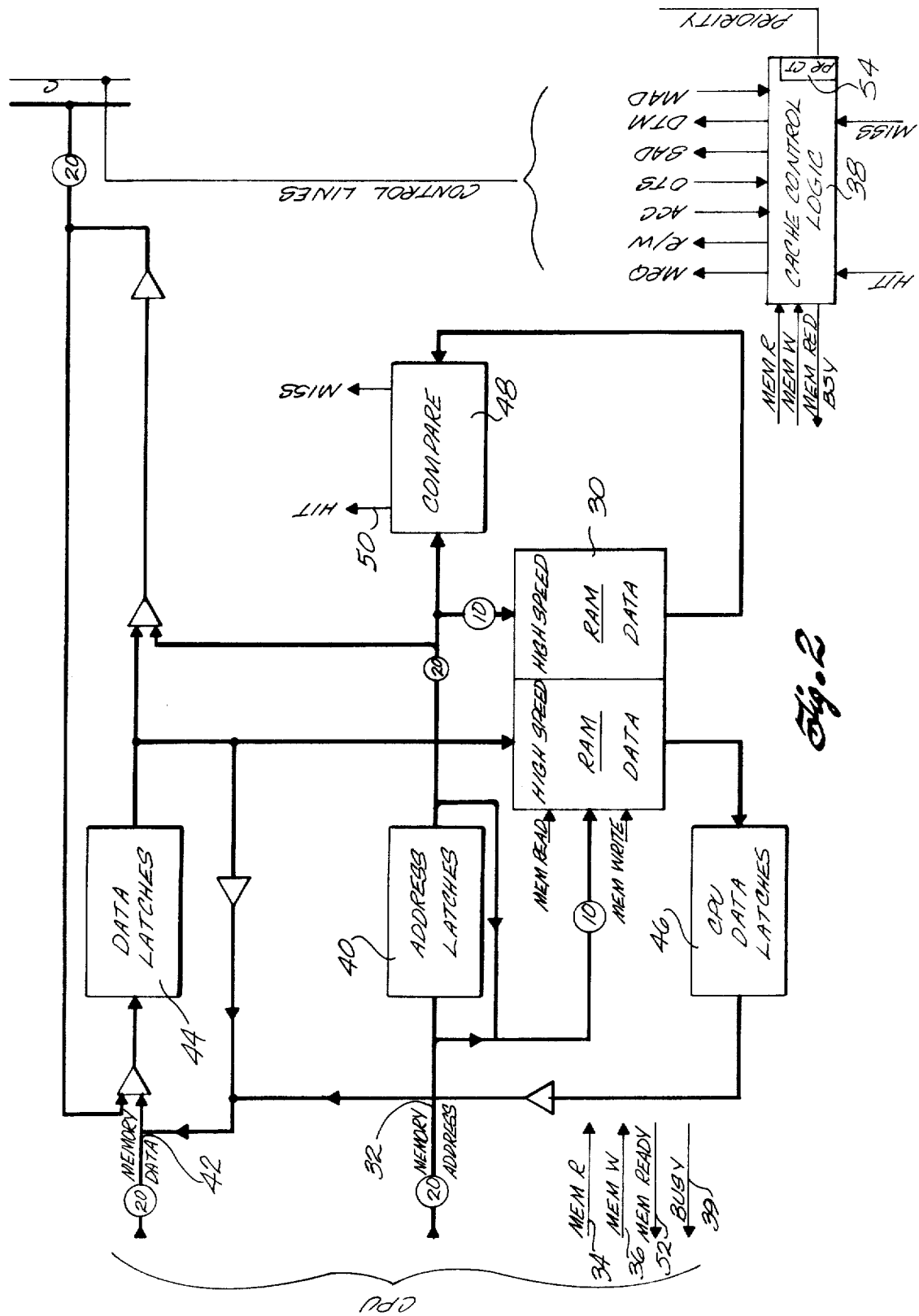

MULTIPROCESSOR SYSTEM WITH CACHE MEMORY

FIELD OF THE INVENTION

This invention relates to a digital computer system, and more particularly to a multiprocessor system in which the processors communicate through cache memories over a common bus with a main memory.

BACKGROUND OF THE INVENTION

Multiprocessing systems in which a plurality of central processing units share a common memory over a time-shared asynchronous memory bus is well known. However, as the speed of processors has increased, the band width limitations of the bus has become a limiting factor in the number of processors that can effectively share the memory over a common bus.

SUMMARY OF THE INVENTION

The present invention is directed to a multiprocessing system which enables a plurality of high speed central processors to share a common memory over an asynchronous bus. The present invention permits a greater number of separate processors to be incorporated into the system without overloading the maximum bit rate capacity (band width) of the bus over which the processors communicate with a common memory.

In brief, the present invention provides improved bus band width for a multiprocessing system by providing an arrangement in which each processor in the multiprocessing system communicates with the common bus to main memory through a high speed cache memory unit. The cache memory includes a high speed random access memory storing a plurality of addressable words, each word including a data portion and a tag portion. When a memory READ operation is initiated by a processor the processor executes a Load command and generates an address in main memory where the data to be read is stored. A group in low order bits of the memory address generated by the processor is used as the address to read out a word of the cache memory. The tag portion of the word read out of the cache memory is then compared with a group of high order bits of the same memory address from the processor and if these two sets of bits are identical, the data portion of the same word read out of the cache memory is transferred directly to the processor to complete the memory access. Thus no access to the main memory over the bus is required. If the tag bits of the addressed word from the cache memory do not compare with the group of high order bits of the memory address, the cache memory unit, using the full address from the processor, initiates a memory Read operation at the corresponding address location in the main memory using the full memory address from the processor and transfers this data over the bus from main memory to the cache memory unit and to the processor. The cache memory unit stores the data from main memory in the memory of the cache memory unit as the data portion of the word stored at the location address corresponding to the group of lower order bits of the same memory address from the processor. The group of higher order bits of the same memory address are simultaneously stored as the tag portion of the word stored in the same address location of the cache memory.

In the case of a memory Write operation initiated by a STORE command in the processor, the cache memory unit associated with the processor causes the address received from the processor to be transferred by the bus to main memory to initiate a memory Write in the main memory. It then transfers the data from the processor to the bus for writing the data into the main memory. At the same time it uses the lower order bits of the address from the processor to address and read out a word in the cache memory. The tag portion of the word read out of the cache memory is compared with the higher order bits of the address from the processor. If there is identity, the data from the processor is used to update the data portion of the word read out of the cache memory and the word is again written in the same location in the cache memory.

It has been found that for all classes of programs using the present invention, the amount of time each processor utilizes the common bus to main memory is substantially reduced. On the average, in 93% of the memory accesses by the processor, the data is already present in the high speed data memory of the cache memory. This enables the number of separate processors communicating with main memory over the bus to be greatly expanded without exceeding the band width limitations of the bus.

DESCRIPTION OF THE DRAWINGS

For a more complete understanding of the invention reference should be made to the accompanying drawings, wherein:

FIG. 1 is a schematic block diagram of the multiprocessing system;

FIG. 2 is a functional block diagram of the cache memory unit; and

FIG. 3 is a functional block diagram of the main memory control.

DETAILED DESCRIPTION

Referring to FIG. 1, there is shown a multiprocessing system comprising a plurality of central processing units, three of which are idicated at 10, 12, and 14. However, the number of processors can be expanded to more than three. The processing units may be of any well known type in which digitally coded data words are processed in parallel and which provides controls for interfacing with a random access memory in response to LOAD or STORE commands in the program executed by the processor. A suitable processor as of the filing date of this application is sold, for example, by General Automation, Inc., designated the GA-16/440CPU. Details on the operation of the GA-16 processor can be obtained from General Automation, Inc., 1055 South East Street, Anaheim, California 92805. Associated with each central processing unit is a high speed cache memory unit, three of which are indicated respectively at 16, 18, and 20. Each cache memory unit interfaces with the associated central processing unit by a group of address lines by which address information is transferred to the cache memory unit, a group of data lines by which data is transferred between the cache memory unit and the central processing unit, and a group of control lines for controlling the transfer of data between the cache memory unit and the central processing unit. The processor uses these lines to transfer and write data into the memories in response to a STORE command or to read data out of the memories in response to a LOAD command.

As hereinafter described in detail, when a central processing unit initiates a memory access, this is serviced by the cache memory unit. However, if the cache memory unit is not capable of directly servicing the request because the addressed location is not present in the cache memory, the cache memory unit initiates a memory access to a main memory 22 over a common bus 24 and memory controller 25. The main memory 22 is a conventional random access memory which can be accessed from any of the cache memories 16, 18, or 20 by means of a group of control lines in the bus 24 which provide asynchronous transfer of address and data information over a group of address/data lines in the bus 24. Access to main memory 22 by any one of the cache memory units 16, 18, or 20 over the common bus 24 is under the control of priority circuits in each of the cache memory units which are linked together by priority control lines forming part of the bus 24. A suitable priority circuit is described in detail in copending application Ser. No. 803,448, filed June 6, 1977, entitled "Asynchronous Priority Circuit for Controlling Access to a Bus," and assigned to the same assignee as the present invention.

Referring to FIG. 2, each cache memory unit includes a high speed random access memory 30 which, for example, stores 1024 individually addressable words. Each addressable location in memory includes a data portion and a tag portion.

When a memory access is initiated by the associated processor, an address word is coupled to the memory address lines 32. The address may, for example, consist of twenty parallel bits. At the same time the processor signals either a memory Read or a memory Write request, respectively, on either of two input control lines 34 or 36, which are connected to the cache control logic, indicated generally at 38. If the cache memory unit is busy, the cache control logic generates a Busy signal on a control line 39 to signal the processor that the cache memory is in a busy state. Otherwise, the cache control logic 38 causes the address word on the lines 32 to be stored in a group of address latches 40. The cache control logic 38 also, in response to a memory Write signal, causes the data word on a group of bidirectional memory data lines 42 from the processor to be stored in a group of data latches 44.

Considering first the operation of the cache memory in response to a memory Read request, the ten lowest order bits of the memory address on the memory lines 32 are used to address one of the words in the memory 30 and a memory Read is initiated. The data portion of the word read out of the memory 30 is set in a group of CPU data latches 46. At the same time the group of tag bits stored in the tag portion of the word read out of the memory 30 is applied to a Compare circuit 48 where they are compared with the ten highest order bits of the address stored in the address latches 40. If the tag bits are identical to the highest order address bits, the Compare circuit signals a "hit." The cache control logic 38, in response to the "hit" signal on output line 50 of the Compare circuit 48 signals the processor over the Memory Ready control line 52 that the data is present. The processor then initiates transfer of the data word over the memory data lines 42 from the CPU data latches 46, completing the Read operation.

In the event the tag bits read out of the tag array of the memory 30 are not identical to the higher order bits of the address received from the processor, the Compare circuit 48 signals a "miss." This signals the cache control logic 38 that the data being addressed is not present in the cache memory. The cache control logic 38 then initiates an access to the main memory 22 over the common bus 24.

To this end, the cache control logic 38 first signals a memory request on the priority control lines by means of a priority circuit 54, such as described in detail in the above-identified copending application and incorporated herein by reference. When access to the bus 24 is granted by the priority circuit to the cache memory unit, the control logic 38 signals a main memory request on the control line MRQ going to the main memory controller 25. At the same time, the full address stored in the latches 40 is coupled to the bus 24. The cache control logic 38 also signals over the R/W control line whether a Read or Write operation is required.

The main memory controller is shown in more detail in FIG. 3. The control lines to the bus 24 are connected to the memory control logic circuit 60. Assuming a memory Read is required, the memory control logic 60 gates the address bits on the bus 24 to a group of address latches 62 and returns an Address Accepted signal over the control line ACC to the cache control logic 38, which responds by clearing the address bits from the bus 24. The memory control logic 60 then initiates a readout of data from the random access main memory 22 using the full 20-bit address in the address latches 62. The memory control logic 60 then activates the data drivers to the bus 24 and issues a data-to-source signal on the line DTS signaling that the data from memory is present on the bus 24. When the DTS signal is received by the cache control logic 38, it causes the data on the bus 24 to be stored in the data latches 44 and provides a Memory Ready signal to the processor, allowing the processor to read the data off the memory data lines 42. At the same time, the cache control logic 38 initiates a memory Write on the high-speed memory 30 causing the data word from the bus 24 to be stored in the data array at the location identified by the lower order bits of the address stored in the address latches 40. The ten highest order bits of the address in the address latches 40 is written in the tag portion of the same word. Thus the cache memory is automatically updated by the memory access initiated by the processor whenever the cache control logic signals a "miss."

If the processor initiates a data Write operation, providing a control signal on the line 36, the cache control logic 38 causes the data word on the memory data lines 42 from the processor to be stored in the data latches 44 and requests access to the bus 24 to the main memory 22. It also initiates a Read operation from the high-speed random access memory 30 in response to the ten lower order bits of the address stored in the latches 40 causing the tag bits to be applied to the Compare circuit 48. If the Compare circuit signals a "hit," the cache control logic causes the data in the data array portion of the high-speed memory 30 to be updated by a memory Write operation using the data word stored in the data latches 44. If the Compare circuit signals a "miss" the cache control logic 38 takes no action beyond signaling a memory Write operation to the main memory controller 25.

As in the memory Read operation, when the cache memory is granted access to the bus 24 by the priority circuit, the cache control logic 38 issues a memory Request and a memory Write signal on the control lines MRQ and R/W to the memory control logic 60. At the same time, the address in the address latches 40 is applied to the bus 24. The address is then stored in the address latches 62 by the controller and an Address Accepted signal is applied to the ACC line from the memory control logic 60 to the cache control logic 38. The cache control logic 38 then couples the data latches 44 to the bus 24 and signals the memory control logic that the data is available by means of a DTM control line. A memory Write operation is then initiated on main memory 22 using the address in the address latches 62 and the data from the bus 24 stored in a set of data latches 66. When the memory Write operation is complete, the memory control logic signals that the memory has accepted the data by means of the control line MAD.

From the above description it will be seen that the transfer of data between a plurality of cache memory units and the main memory over the common bus 24 utilizes a conventional "hand shake" asynchronous control in which address and data transfers share the same bus lines. The operation of the processor is the same as though the processor were connected directly to the main memory 22, yet because of the associated cache memory units, common bus, and memory controller, actual access to main memory by the processors is greatly reduced. The cache memory units operate as the "master" units and the controller operates as the "slave" unit. The interface between each processor and associated cache memory unit is identical to the interface between the memory controller and the main memory, with separate sets of data lines and address lines.

What is claimed is:

1. A multiprocessor system comprising a plurality of separate processor units, each processor unit having associated therewith a cache memory unit; an addressable main memory; a common bus connecting the cache memory units to the main memory for transferring addresses to the main memory and transferring data between the cache memory unit and the main memory; each processor unit including means for directing a group of address signals and memory read or write signals to the associated cache memory unit; the cache memory unit including a high speed addressable memory for storing data and tag information, means in each cache memory unit responsive to a first portion of the address signals and the memory read signal from the associated processor unit for reading out a selected word containing data and tag information from the location in the high speed addressable memory identified by said first portion of the address signals, means in each cache memory unit comparing the tag information of the word read out of the high speed memory with a second portion of the address signals from the associated processor unit, means in each cache memory unit responsive to the comparing means when the compared tag information and the second portion of the address signals are identical for transferring the data information of the word read out of the high speed memory to the associated processor unit, means in each cache memory unit responsive to a memory read signal from the processor unit and the comparing means when the compared tag information is not identical to said second portion of the address signals from the processor unit for applying both of said portions of said group of address signals from the associated processor unit to the common bus and initiating a memory read cycle in the main memory, and means in each cache memory unit for transferring data signals received on the common bus from the main memory in response to the main memory cycle to the associated processor unit.

2. Apparatus of claim 1 wherein each cache memory unit further includes means for storing the data signals received on the common bus from the main memory in the high speed memory as the data information of the word stored at the address corresponding to said first protion of the address signals from the associated processor unit, and means storing said second portion of the address signals from the processor unit as the tag information of the word stored at the same location in the high speed memory.

3. The apparatus of claim 1 further including priority control means associated with the cache memory units for controlling access to the common bus among cache memory units seeking simultaneous access to the main memory.

4. Apparatus of claim 1 wherein each cache memory unit includes means responsive to a memory write signal from the associated processor unit for transferring the data signals and address signals from the processor unit over the common bus to the main memory and initiating a memory write cycle in main memory, means in the cache memory unit responsive to a memory write signal from the associated processor unit, means in each cache memory unit responsive to a first portion of the address signals and the memory write signal from the associated processor unit for reading out a selected word containing data and tag information from the location in the high speed addressable memory identified by said first portion of the address signals, means in each cache memory unit comparing the tag information of the word read out of the high speed memory with a second portion of the address signals from the associated processor unit, means in each cache memory unit responsive to the comparing means when the compared tag information and the second portion of the address signals are identical for storing signals from the processor unit as the data information of the addressed word in the high speed memory and storing the second portion of the address signals from the processor unit as the tag information of the addressed word.

* * * * *